March 13, 1945.  W. H. GILLE ET AL  2,371,236
CONTROL DEVICE
Filed Aug. 6, 1942
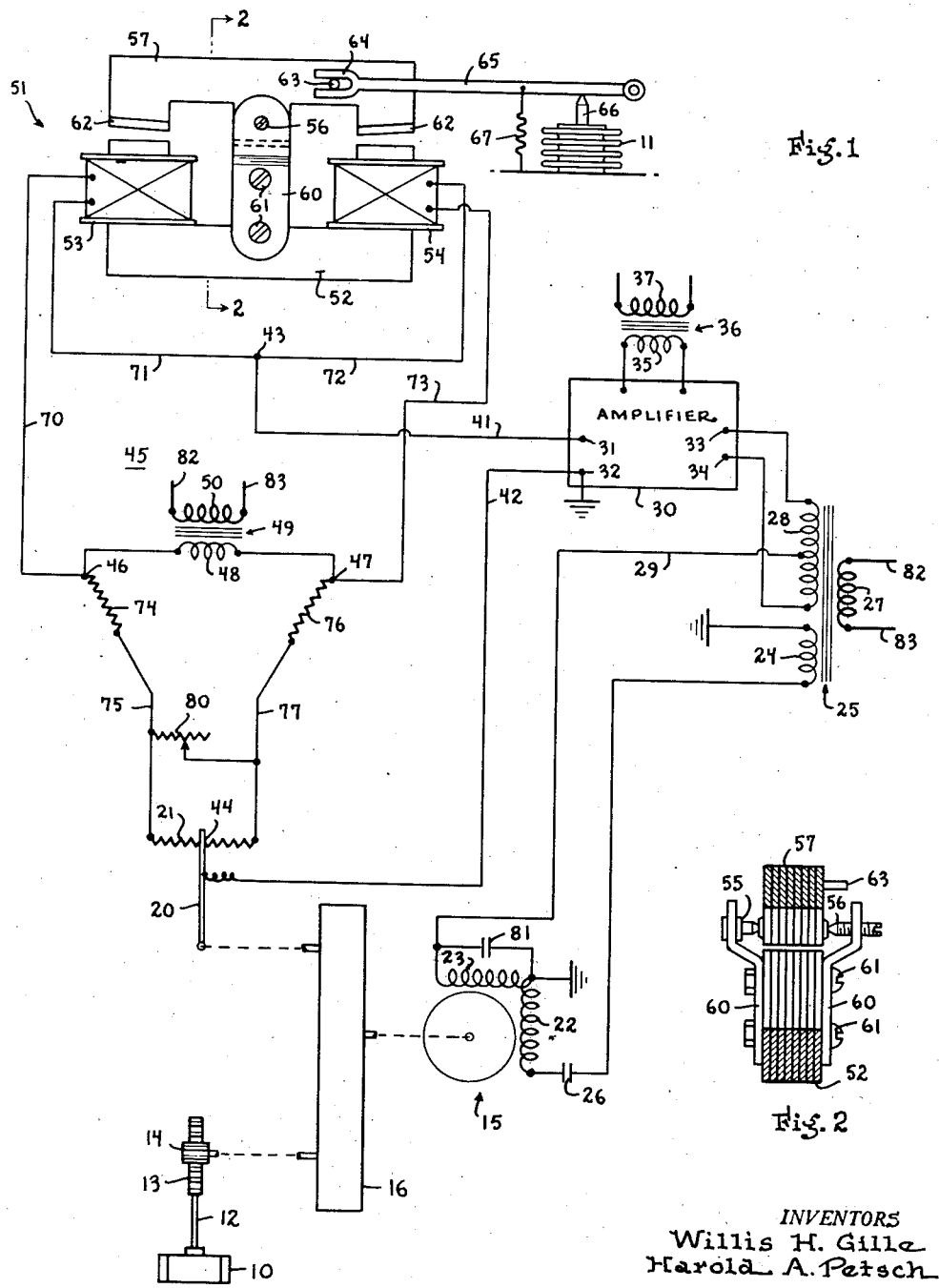
INVENTORS
Willis H. Gille
Harold A. Petsch
By George H. Fisher
Attorney Patented Mar. 13, 1945

2,371,236

UNITED STATES PATENT OFFICE 2,371,236

CONTROL DEVICE

Willis H. Gille, St. Paul, and Harold A. Petsch, Minneapolis, Minn., assignors to Minneapolis-Honeywell Regulator Company, Minneapolis, Minn., a corporation of Delaware Application August 6, 1942, Serial No. 453,914

2 Claims. (Cl. 171—242)

The present invention relates to control apparatus, and more particularly to electrical follow-up arrangements of the type wherein a device responsive to a variable condition operates to produce an electrical signal variable in accordance with the changes of the condition, and wherein the electrical signal so produced is used to actuate suitable control devices.

An object of the present invention is to produce a transmitter device for an electrical control system, which may be readily operated by a condition responsive device of low power characteristics.

Another object of the invention is to construct an improved variable impedance transmitter device for an electrical control system comprising a stationary member and a movable armature member. A further object is to provide in such a device an armature structure which is movable by low powered condition responsive means, and which is supported by means other than the condition responsive means.

By the term "condition responsive device" as used herein is meant any control device which automatically responds to any variable condition or force. While we have disclosed our invention as applied to a system wherein temperature is the controlling condition, it is equally applicable to systems wherein the controlling condition may be, for example, the position of a movable member, or a force such as gravity or the force due to a magnetic field.

Another object of the invention is to provide, in an electromagnetic transmitter device wherein an armature is moved into engagement with a stationary core member, means for preventing sticking of the armature and core due to residual magnetism.

Another object of the invention is to construct an electromagnetic transmitter device for control apparatus which shall be insensitive to the presence of stray magnetic fields.

Other objects and advantages of my invention will become apparent from a consideration of the appended claims, specification, and drawing, in which Figure 1 represents, somewhat diagrammatically, a control system utilizing a preferred embodiment of my invention, and Figure 2 is a cross-sectional view taken along the line 2—2 of Figure 1, looking in the direction of the arrows.

In the drawing is shown a valve 10, which may, for example, control a supply of temperature changing fluid such as steam, and which is controlled in accordance with the temperature existing adjacent a thermostat 11, which is shown as being of the fluid filled bellows type.

Valve 10 is provided with a stem 12, upon which is mounted a rack 13. A pinion 14, engageable with the rack 13, is driven by a motor generally indicated at 15 through a gear train shown diagrammatically at 16. Motor 15 also drives, through the gear train 16, a slider 20 which is movable with respect to a slidewire resistance 21.

Motor 15 is shown as being of the split phase type, having a pair of field windings 22 and 23 which are 90 degrees apart in space phase. Winding 22 is continuously energized from a secondary winding 24 of a transformer 25. A condenser 26 is connected in series between the secondary winding 24 and the motor winding 22.

Transformer 25 has a primary winding 27 and another secondary winding 28.

Motor winding 23 is energizable from secondary winding 28, energization thereof being controlled by an electronic amplifier 30, which may be for example an amplifier of the type shown and described in the copending application of Albert P. Upton, Serial No. 437,561, dated April 3, 1942. Amplifier 30 is provided with input terminals 31 and 32 and output terminals 33 and 34. Power for the final output stage of amplifier 30 is supplied from secondary winding 28, while power for other parts of the amplifier circuit is supplied from a secondary winding 35 of a transformer 36 having a primary winding 37.

Amplifier input terminals 31 and 32 are connected by conductors 41 and 42, respectively, to output terminals 43 and 44 of an impedance bridge circuit generally indicated at 45. Output terminal 44 is the point of engagement of slider 20 with slidewire 21. The bridge circuit 45 has input terminals 46 and 47 connected to a secondary winding 48 of a transformer 49 having a primary winding 50.

Unbalance of the bridge circuit 45 is controlled by a variable impedance device generally indicated at 51. The variable impedance device 51 includes a stationary core member 52, of a generally E shaped configuration. On the left and right legs of the core member 52, impedance coils 53 and 54, respectively, are mounted. The core member 52 may preferably be laminated, as indicated in Figure 2. Attached to the center leg of the core member 52, are a pair of bracket plates 60, which are attached to the core member 52 by any suitable means such as the screws 61. The upper ends of the plates 60 are offset from the core member 52, and carry stationary bearings 55 and 56. The bearing 56 threadedly engages the plate 60, so that the tightness of the bearing assembly may be adjusted.

Pivotally supported in the bearings 55 and 56, is a generally E shaped armature member 57. The bearings 55 and 56 engage the armature member 57 at a point on the center leg of the E. The armature member 57 is therefore substantially balanced about its pivotal support. The outer legs of the armature member 57 are extended toward the outer legs of the stationary core member 52. When the armature member 57 pivots about the bearings 55 and 56, the outer legs move towards and away from the stationary core member 52. The surfaces of the outer legs of the armature member 57 which extend toward the outer legs of the stationary core member 52 are provided with plates 62 of copper or other electrically conductive, non-magnetic material to prevent any sticking of the armature to the stationary core member.

The armature member 57 carries a pin 63. Pin 63 is engaged by a yoke 64 mounted on one end of a lever 65, whose opposite end is pivoted to a fixed support.

A pin 66 attached to the top of the thermostatic bellows 11 engages a portion of lever 65 so as to cause rotation thereof. A tension spring 67 has one end attached to the lever 65 and its opposite end fixed, so as to bias the lever 65 into engagement with pin 66 on thermostat 11.

The upper left arm of bridge circuit 45 connects input terminal 46 with output terminal 43, and includes a conductor 70, coil 53, and a conductor 71. The upper right arm of bridge circuit 45 connects output terminal 43 with input terminal 47, and includes a conductor 72, coil 54, and a conductor 73.

The lower left arm of bridge circuit 45 connects input terminal 46 and output terminal 44, and includes a fixed resistance 74, a conductor 75, and that part of slidewire resistance 21 between its left-hand terminal and its point of engagement with slider 20.

The lower right arm of bridge circuit 25 connects input terminal 47 with output terminal 44 and includes a fixed resistance 76, a conductor 77, and that portion of slide-wire resistance 21 between its right-hand terminal and its point of engagement with slider 20.

A variable resistance 80 is connected across the slidewire resistance 21 in order that the ratio between a given unbalance effect of the bridge and the amount of movement of slider 20 necessary to restore balance to the bridge may be adjusted, in a manner well known in the art.

A condenser 81 is connected across the terminals of motor winding 23, and is proportioned with respect to winding 23 to provide a series resonant loop circuit of low impedance therethrough, so as to facilitate the flow of current induced in winding 23 by transformer action from winding 22.

Referring to the variable impedance device 51, it may be observed that the electrical connections to the coils 53 and 54 are such that the magnetic flux produced by both coils is of the same polarity at any instant. It is assumed that both coils are wound in the same direction. In other words, when the flux produced by coil 53 is downward in direction, the flux produced by coil 54 is also downward. Each coil may therefore be said to produce a flux which tends to oppose the flow through that coil of flux produced by the other coil.

The magnetic circuit of the flux produced by coil 53 may be traced (assuming the flux direction to be downward) through the left leg of core member 52, to the right along the yoke portion of member 52, up through the center leg, across the air gap adjacent the bearings 55 and 56 to armature member 57, to the left along member 57, down through its left leg and across the air gap to the left leg of core member 52.

The magnetic circuit of the flux produced by coil 54 may be traced (assuming the direction downward) through the right leg of core member 52, to the left along the yoke portion of member 52, up through the center leg, across the air gap adjacent bearings 55 and 56 to armature member 57, to the right along member 57, down through its right leg and across the air gap to the right leg of member 52.

*Operation*

When the parts are in the position shown in the drawing, the armature member 57 is in its mid-position, and the slider 20 is likewise in its mid-position. Bridge circuit 45 is balanced, and the motor 15 is stationary with the valve 10 half-way open. Under these conditions, let is be assumed that the temperature adjacent the thermostat 11 rises.

A rise in temperature adjacent the thermostat 11 causes the gas or vapor therein to expand, pushing the pin 66 upwardly and rotating lever 65 in a clockwise direction about its pivot. This motion of lever 65 acts through yoke 64 and pin 63, causing rotation of armature member 57 in a counterclockwise direction about the bearings 55 and 56. This decreases the air gap in the magnetic circuit of the flux produced by the coil 53, and increases the air gap in the magnetic circuit of the flux produced by the coil 54. The flux threading the coil 53 therefore increases, increasing the impedance of the coil 53. On the other hand, the flux through the coil 54 decreases, decreasing the impedance of that coil.

Referring now to the bridge circuit 45, it will be seen that when the impedance of coil 53 increases and the impedance of coil 54 decreases, the potential of output terminal 43 is shifted from a value exactly half-way between that of input terminals 46 and 47 to a value somewhat closer to that of input terminal 47. Therefore, a potential difference exists between output terminals 43 and 44, and the phase of this potential difference is the same as if terminal 43 were connected to terminal 47 and terminal 44 were connected to input terminal 46. In other words, it may be stated that the phase of the potential appearing at terminals 43 and 44 is opposite to the phase of the potential applied to the terminals 46 and 47. This potential difference is fed through conductors 41 and 42 to input terminals 31 and 32 of amplifier 30.

As described in detail in the copending Upton application previously referred to, the amplifier 30 is of a type which produces in the output circuit including conductor 29 and motor winding 23 an alternating current whose phase is dependent upon the phase of the potential applied to input terminals 31 and 32. The current flowing through winding 22 is of substantially constant phase, as determined by the relative impedances of condenser 26 and winding 22. The winding 23, on the other hand, is supplied with current which either leads or lags the current in winding 22 by approximately 90 electrical degrees, depending upon the direction of unbalance of bridge circuit 45.

In accordance with the well known characteristics of a split phase motor, when the windings 22 and 23 are supplied with current substantially 90 degrees out of phase, the motor 15 is caused to rotate in a predetermined direction depending upon which current leads the other. In the present instance, the direction will be such as to rotate slider 20 in a clockwise direction, thereby moving output terminal 44 of bridge 45 to the right along slidewire resistance 21 and decreasing the difference in potential between output terminals 43 and 44. At the same time, the motor 15 drives the pinion 14 in a direction so as to move the valve 10 towards its closed position.

As slider 20 moves to the right along slidewire resistance 21, it reaches a point where the potential of output terminal 44 exactly equals that of output terminal 43, and the bridge circuit 45 is again balanced. No signal is then applied to the input terminals 31 and 32 of amplifier 30, winding 23 of motor 15 is no longer energized, and therefore the motor stops.

In a similar manner, if, with the parts in the position shown in the drawing, the temperature adjacent the thermostat 11 decreases, the lever 65 is rotated counter-clockwise, thereby causing rotation of armature member 57 clockwise. This decreases the air gap in the right leg of the impedance device 51, and increases the air gap in the left leg, thereby increasing the impedance of coil 54 and decreasing the impedance of coil 53. Bridge circuit 45 is then unbalanced in the opposite sense, the potential of output terminal 43 being shifted toward that of input terminal 46. A potential difference then exists between output terminals 43 and 44 which is of the same phase as the potential applied to input terminals 46 and 47. This potential is applied to amplifier input terminals 31 and 32 and causes the production of a current in the motor winding 23. Motor windings 22 and 23 are again energized with current differing in phase by 90 degrees, but the phase relationship between these two currents is opposite, that is, the current which was leading before is now the lagging current, and therefore rotation of motor 15 takes place in the opposite direction. This rotation of motor 15 drives slider 20 in a counter-clockwise direction so as to move terminal 44 to the left along slidewire resistance 21 and rebalance the circuit 45. At the same time, pinion 14 is rotated in a proper direction to cause opening of the valve 10.

Referring to the impedance device 51, it will be seen that we have provided an improved variable impedance device for producing an alternating electrical signal variable in accordance with the characteristics of a variable condition. Furthermore, the power which must be supplied by the sensitive element to operate the device 51 is very small, and the movable portion of the device 51 is supported by means other than the condition responsive element. It should also be apparent that I have provided a magnetic pickup arrangement for an electronic amplifier which is not subject to the influence of stray magnetic fields, inasmuch as any stray fields existing in the neighborhood of the impedance device 51 would produce equal effects in windings 53 and 54.

While we have shown and described a preferred embodiment of our invention, other modifications thereof will readily occur to those skilled in the art, and we therefore wish our invention to be limited only by the definitions set forth in the appended claims.

We claim as our invention:

1. In an electrical bridge arrangement for producing an alternating electrical signal variable in phase and magnitude in accordance with the direction and magnitude of departure of a variable condition from a predetermined value, a source of alternating potential, a pair of series connected impedance arms connected to said source, and a variable reactor including a pair of series connected coils also connected to said source of potential in parallel with said pair of impedance arms so that the junctions of said impedance arms and said coils constitute the output terminals of said bridge arrangement, said variable reactor comprising a substantially E-shaped core member of magnetic material having a center leg and a pair of outer legs, said coils being disposed on each of the outer legs, an armature member rotatable about a point aligned with said center leg, said armature and said legs of said core member each having a pair of contacting portions for cooperating with those of the other member, means for preventing magnetic engagement of said contacting portions, and means responsive to said variable condition for causing relative rotation between said armature and core members thereby to oppositely vary the spaces between said outer legs and said armature portions and thus unbalance said bridge arrangement to produce at said output terminals an alternating voltage of the frequency of said source and having a phase relation and magnitude dependent upon the value of said condition.

2. In an electrical bridge arrangement for producing an alternating electrical signal variable in phase and magnitude in accordance with the direction and magnitude of departure of a variable condition from a predetermined value, a source of alternating potential, a pair of series connected impedance arms connected to said source, and a variable reactor including a pair of series connected coils also connected to said source of potential in parallel with said pair of impedance arms so that the junctions of said impedance arms and said coils constitute the output terminals of said bridge arrangement, said variable reactor comprising a substantially E-shaped core member of magnetic material having a center leg and a pair of outer legs, said coils being disposed on each of the outer legs, an E-shaped armature member rotatable about a point aligned with said center leg, said armature and said legs of said core member each having a pair of contacting portions for cooperating with those of the other member, at least one of the pairs being of non-magnetic material, and means responsive to said variable condition for causing relative rotation between said armature and core members thereby to oppositely vary the spaces between said outer legs and said armature portions and thus unbalance said bridge arrangement to produce at said output terminals an alternating voltage of the frequency of said course and having a phase relation and magnitude depending upon the value of said condition.

WILLIS H. GILLE.
HAROLD A. PETSCH.